(12) United States Patent
Murakami (10) Patent No.: US 10,807,247 B2
(45) Date of Patent: Oct. 20, 2020

(54) ROBOT OPERATION APPARATUS

(71) Applicant: Fanuc Corporation, Yamanashi (JP)

(72) Inventor: Wataru Murakami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 267 days.

(21) Appl. No.: 16/142,669

(22) Filed: Sep. 26, 2018

(65) Prior Publication Data

US 2019/0160685 A1    May 30, 2019

(30) Foreign Application Priority Data

Nov. 28, 2017 (JP) .................. 2017-227758

(51) Int. Cl.
| | | |
|---|---|---|
| *G05B 15/00* | (2006.01) | |
| *B25J 13/02* | (2006.01) | |
| *B25J 9/06* | (2006.01) | |
| *B25J 13/08* | (2006.01) | |
| *G05B 19/02* | (2006.01) | |

(52) U.S. Cl.
CPC ............... *B25J 13/02* (2013.01); *B25J 9/06* (2013.01); *B25J 13/085* (2013.01); *G05B 19/02* (2013.01)

(58) Field of Classification Search
CPC ... B25J 13/02; B25J 9/06; B25J 13/085; B25J 9/042; G05B 19/02; G05B 19/0426
USPC .................................................. 700/262, 264
See application file for complete search history.

(56) References Cited

U.S. PATENT DOCUMENTS

| | | | |
|---|---|---|---|
| 6,212,443 B1 | 4/2001 | Nagata et al. | |
| 2005/0222587 A1 | 10/2005 | Jinno et al. | |
| 2006/0178775 A1 | 8/2006 | Zhang et al. | |
| 2010/0145520 A1 | 6/2010 | Gerio et al. | |
| 2012/0111135 A1* | 5/2012 | Ichibangase | B25J 19/0025 74/490.06 |
| 2016/0375580 A1* | 12/2016 | Kinoshita | B25J 9/1628 700/253 |
| 2017/0095932 A1 | 4/2017 | Murakami | |
| 2017/0129106 A1 | 5/2017 | Schautt et al. | |
| 2019/0160671 A1* | 5/2019 | Kurihara | B25J 13/06 |

(Continued)

FOREIGN PATENT DOCUMENTS

| | | |
|---|---|---|
| CN | 101999938 A | 4/2011 |
| DE | 3211992 A1 | 10/1983 |
| EP | 0850730 A1 | 7/1998 |

(Continued)

OTHER PUBLICATIONS

Usui, Takumi; Decision to Grant a Patent; Japanese Application No. 2017-227758; dated Jun. 2, 2020; 3 pages.

(Continued)

*Primary Examiner* — Khoi H Tran
*Assistant Examiner* — B M M Hannan
(74) *Attorney, Agent, or Firm* — Shackelford, Bowen, McKinley & Norton, LLP (57) ABSTRACT

A present robot operation apparatus operates a robot including a plurality of joints, and includes an operation unit that transmits a signal corresponding to an operation by an operator to a control unit of the robot, and the operation unit is configured to be detachably attached to an attachment member fixed to an arm member of the robot arranged closer to a base than the joint closest to a tip among the plurality of joints.

5 Claims, 10 Drawing Sheets

(56) References Cited

U.S. PATENT DOCUMENTS

| | | | |
|---|---|---|---|
| 2019/0248030 A1* | 8/2019 | Matsuda | B25J 13/084 |
| 2020/0180143 A1* | 6/2020 | Yihua | B25J 9/1633 |

FOREIGN PATENT DOCUMENTS

| | | |
|---|---|---|
| EP | 1584300 A2 | 10/2005 |
| EP | 2194434 A1 | 6/2010 |
| JP | S58-071086 A | 4/1983 |
| JP | S58-181598 A | 10/1983 |
| JP | S58-181493 U | 12/1983 |
| JP | S60-163108 A | 8/1985 |
| JP | S61-071393 U | 5/1986 |
| JP | S63-278777 A | 11/1988 |
| JP | H02-043193 U | 3/1990 |
| JP | H02-279289 A | 11/1990 |
| JP | H04-040506 A | 2/1992 |
| JP | H06-008168 A | 1/1994 |
| JP | H09-150382 A | 6/1997 |
| JP | H09-150383 A | 6/1997 |
| JP | H11-227470 A | 8/1999 |
| JP | H11-277470 A | 10/1999 |
| JP | 2007-130485 A | 5/2007 |
| JP | 2009-006465 A | 1/2009 |
| JP | 2009-291882 A | 12/2009 |
| JP | 2010-149273 A | 7/2010 |
| JP | 2010-264527 A | 11/2010 |
| JP | 2011-036964 A | 2/2011 |
| JP | 2012-157946 A | 8/2012 |
| JP | 2014-117783 A | 6/2014 |
| JP | 2015-182142 A | 10/2015 |
| JP | 2017-064878 A | 4/2017 |
| JP | 2017-514707 A | 6/2017 |

OTHER PUBLICATIONS

Usui, Takumi; Notice of Reasons for Refusal for Japanese Patent Application No. 2017-227758; dated Oct. 29, 2019; 6 pages.
Pasona Group Inc.; Search Report by Registered Search Organization; Japanese Patent Application No. 2017-227758; dated Oct. 23, 2019; 9 pages.

* cited by examiner

ROBOT OPERATION APPARATUS

CROSS-REFERENCE TO RELATED APPLICATIONS

This application is based on and claims priority to Japanese Patent Application No. 2017-227758 filed on Nov. 28, 2017, the content of which is incorporated herein by reference in its entirety.

TECHNICAL FIELD

The present invention relates to a robot operation apparatus, and more specifically, relates to a robot operation apparatus transmitting a signal corresponding to an operation by an operator to a control unit of a robot.

BACKGROUND ART

As such robot operation apparatuses, a robot operation apparatus is known that is fixed to a member closest to the tip of an arm part of a robot including a plurality of joints (for example, refer to PTL 1). This robot operation apparatus is configured such that an operation handle is fixed to the tip of the arm part via a force sensor, the force sensor detects the force applied to the operation handle, and a signal based on the direction and magnitude of the detected force is transmitted to a robot control unit.

Additionally, a robot operation apparatus is known that is attached to a peripheral surface of a member closest to the tip of an arm part of a robot including a plurality of joints (for example, refer to PTL 2). This robot operation apparatus is configured such that a hook portion is formed on a peripheral surface of the member closest to the tip of the arm part via a force sensor, and when force is applied by hooking a tip of an operation stick on the hook portion, and the magnitude and direction of the force is detected by the force sensor, a signal corresponding to the detection result is transmitted to a control unit of a robot.

CITATION LIST

Patent Literature

{PTL 1}
Japanese Unexamined Patent Application, Publication No. 2017-064878
{PTL 2}
Japanese Unexamined Patent Application, Publication No. 2009-006465

SUMMARY OF INVENTION

A robot operation apparatus according to one aspect of the present disclosure is a robot operation apparatus for operating a robot having a plurality of joints, the robot operation apparatus including: an operation unit that transmits a signal corresponding to an operation by an operator to a control unit of the robot, wherein the operation unit is configured to be detachably attached to an arm member of the robot arranged closer to a base than a joint closest to a tip among the plurality of joints, or detachably attached to an attachment member fixed to the arm member.

DESCRIPTION OF EMBODIMENTS

Figure 1:
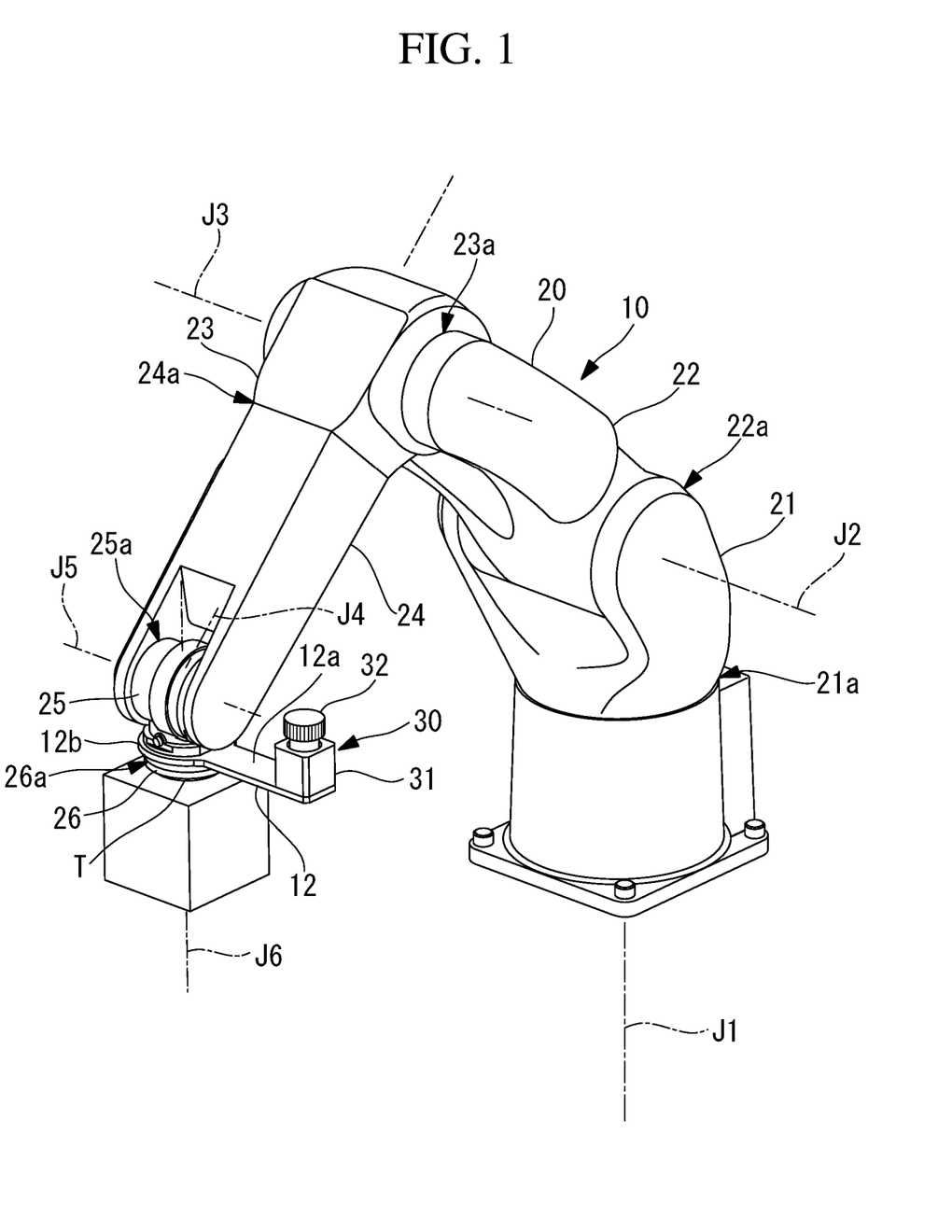
FIG. 1 is a perspective view of a robot operation apparatus of one embodiment of the present invention, and a robot operated by the robot operation apparatus.
Figure 2:
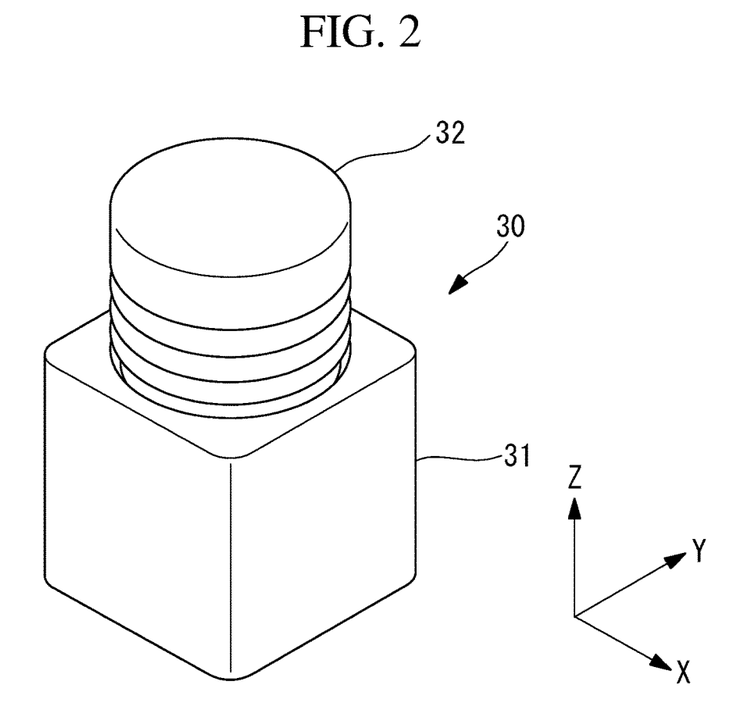
FIG. 2 is a perspective view of the robot operation apparatus of the present embodiment.

A robot operation apparatus according to one embodiment of the present invention is described below with reference to the drawings. This robot operation apparatus is provided in a robot 10 as shown in FIG. 1, for example.

The robot operation apparatus includes an operation unit 30 that is attached to a plate-like protruding portion 12a of an attachment member 12 fixed to the robot 10, and that transmits a signal corresponding to an operation by an operator to a control unit 40 of the robot 10.

Figure 3:
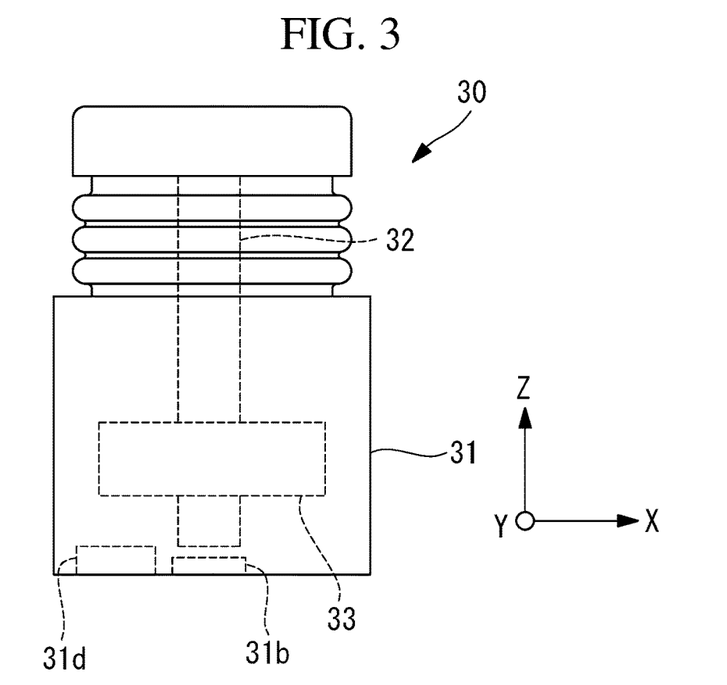
FIG. 3 is a front view of the robot operation apparatus of the present embodiment.
Figure 4:
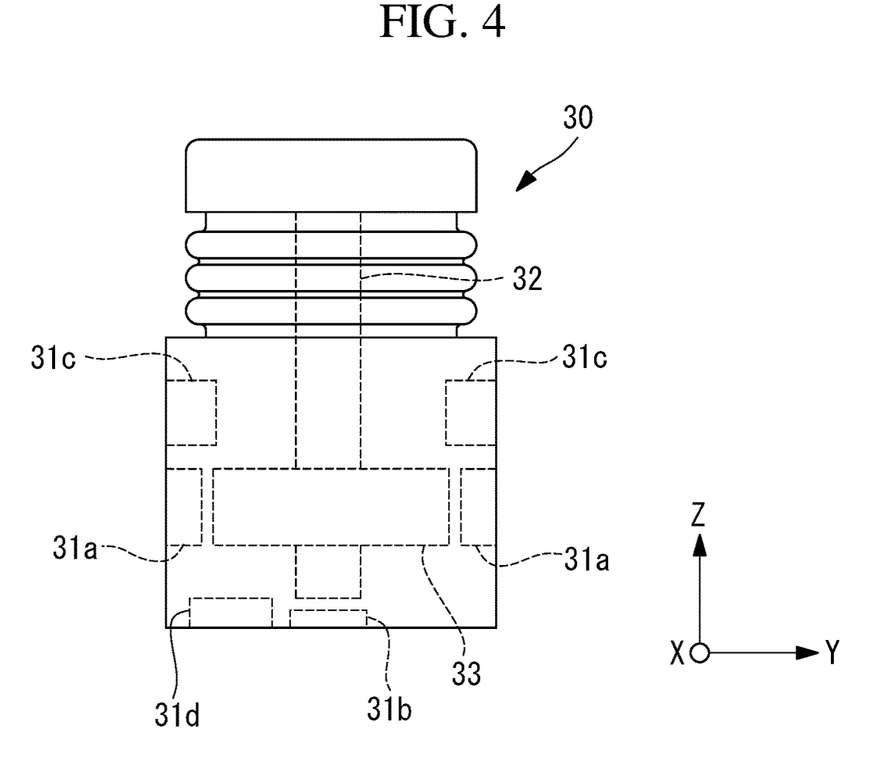
FIG. 4 is a side view of the robot operation apparatus of the present embodiment.
Figure 5:
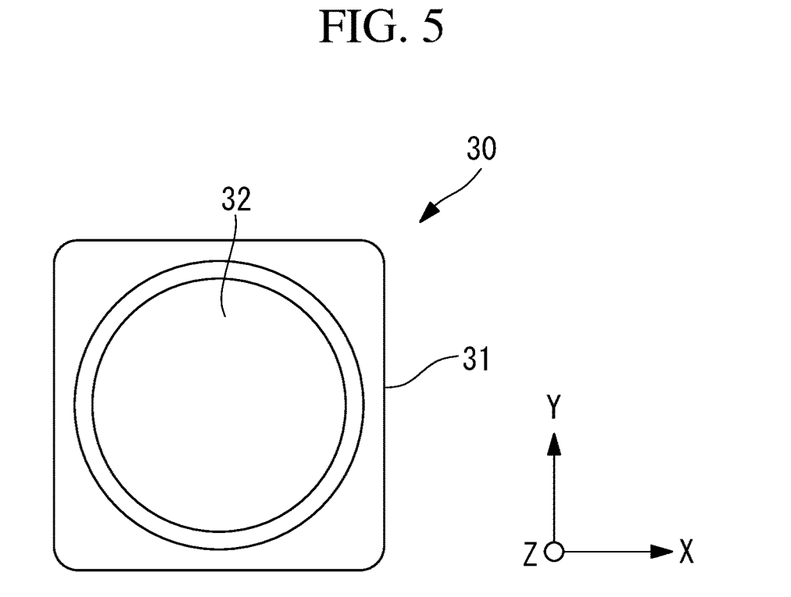
FIG. 5 is a top view of the robot operation apparatus of the present embodiment.

As shown in FIG. 2 to FIG. 5, the operation unit 30 includes a rectangular-shaped operation unit body 31, and an operation knob 32 attached to the operation unit body 31. FIG. 3 is a figure of the operation unit 30 seen from the Y axis direction, FIG. 4 is a figure of the operation unit 30 seen from the X axis direction, and FIG. 5 is a figure of the operation unit 30 seen from the Z axis direction.

In the operation unit body 31, there are provided a pair of X axis direction biasing members (coil springs) that bias the operation knob 32 toward the center of the X axis direction and that are not shown, a pair of Y axis direction biasing members (coil springs) that bias the operation knob 32 toward the center of the Y axis direction and that are not shown, a pair of Z axis direction biasing members (coil springs) that bias the operation knob 32 toward the center of the Z axis direction and that are not shown, and a pair of rotation direction biasing members (torsion springs) that bias the operation knob 32 toward the center of the rotation direction around the Z axis and that are not shown. Note that the operation knob 32 can be operated in the Z axis direction by pulling or pushing the operation knob 32 in the Z axis direction.

Additionally, in the operation unit body 31, there is provided a signal generation unit 33 that generates a signal corresponding to the direction and magnitude of the operation of the operation knob 32, and transmits the generated signal to the control unit 40. Similar to a well-known joystick, the signal generation unit 33 includes a sensor that detects the direction and magnitude of an operation of the operation knob 32, a circuit that generates a signal corresponding to a detection value of the sensor, an antenna for wirelessly transmitting the signal, and the like.

Magnets 31a are provided on surfaces facing the X axis direction or the Y axis direction (a surface facing the Y axis direction in the present embodiment) of the operation unit body 31, and a magnet 31b is also provided on a surface facing the Z axis direction of the operation unit body 31. The surface facing the Z axis direction is the surface on a side opposite to the side in which the operation knob 32 is provided. Additionally, proximity sensors (attachment state detection sensors) 31c are provided near the magnets 31a, and a proximity sensor (attachment state detection sensor) 31d is also provided near the magnet 31b.

Figure 6:
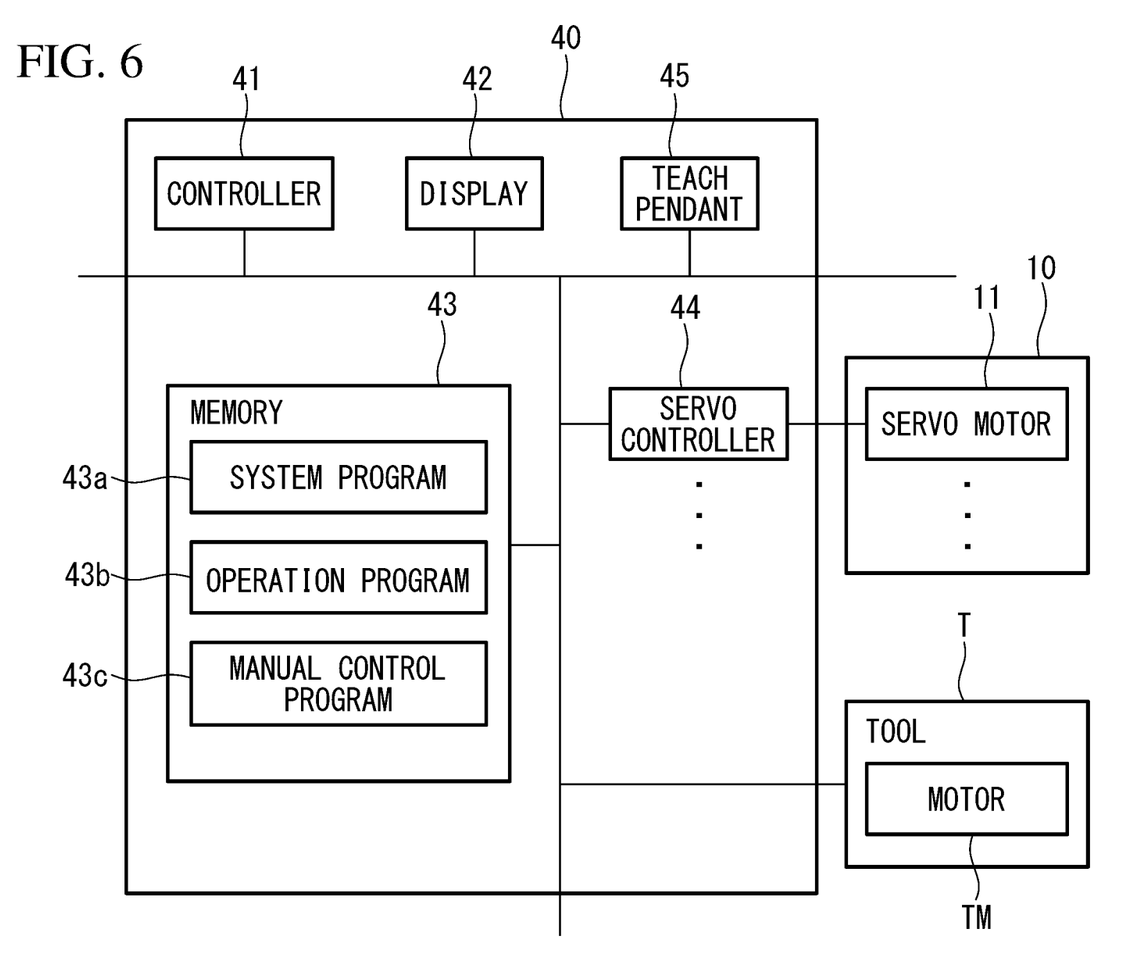
FIG. 6 is a block diagram of a control unit of the robot of the present embodiment.

An arm part 20 of the robot 10 includes a plurality of arm members 21, 22, 23, 24, 25 and 26 and joints 21a, 22a, 23a, 24a, 25a and 26a, and includes a plurality of servo motors 11 driving the plurality of joints 21a, 22a, 23a, 24a, 25a and 26a (refer to FIG. 6). Various kinds of servo motors, such as a rotary motor and a linear motor, can be used as each of the servo motors 11. Each of the servo motors 11 contains an actuation position detection apparatus, such as an encoder, which detects the actuation position of the servo motor 11, and a detection value of the actuation position detection apparatus is transmitted to the control unit 40.

As shown in FIG. 1, the arm member 21 is a pivoting member that pivots around a J1 axis by means of the joint 21a, the arm member 22 is a shaft member that rotates around a J2 axis by means of the joint 22a, the arm member 23 is a shaft member that rotates around a J3 axis by means of the joint 23a, the arm member 24 is a wrist shaft member that rotates around a J4 axis by means of the joint 24a, the arm member 25 is an swinging member that swings around a J5 axis by means of the joint 25a, and the arm member 26 is a wrist flange member that rotates around a J6 axis by means of the joint 26a.

A tool T is attached to a tip portion of the arm member 26, and predetermined works such as a conveying work, machining, and the like are performed by the tool T. The Tool T is provided with a motor TM (refer to FIG. 6) that drives the tool T. The motor TM is connected to the control unit 40, and is controlled by the control unit 40.

As shown in FIG. 6, the control unit 40 includes, for example, a controller 41 including a CPU, a RAM, etc., a display 42, a memory 43 including a nonvolatile storage, a ROM, etc., a plurality of servo controllers 44 provided so as to correspond to the servo motors 11 of the robot 10, respectively, and a teach pendant 45 that is connected to the control unit 40, and can be carried by the operator. The teach pendant 45 may be configured to wirelessly communicate with the control unit 40.

The memory 43 stores a system program 43a, and the system program 43a handles the basic function of the control unit 40. Additionally, the memory 43 stores an operation program 43b that is set in order to make the robot 10 perform a predetermined work, and a manual control program 43c that controls the robot 10 at the time of a manual mode in which the robot 10 is moved based on the signal from the operation unit 30.

The controller 41 operates according to the system program 43a, and when performing a predetermined work, the controller 41 reads the operation program 43b stored in the memory 43, temporarily stores the operation program 43b in a RAM, and sends a control signal to each of the servo controllers 44 in accordance with the read operation program 43b, thereby controlling a servo amplifier of each of the servo motors 11 of the robot 10, and sending the control signal also to the motor TM of the tool T.

At the time of the manual mode, the controller 41 reads the manual control program 43c stored in the memory 43, temporarily stores the manual control program 43c in the RAM, and sends the control signal to each of the servo controllers 44 based on the signal from the operation unit 30, thereby controlling the servo amplifier of each of the servo motors 11 of the robot 10.

The attachment member 12 includes a ring-like part 12b fixed to a peripheral surface on the tip side of the arm member 25 of the arm part 20 of the robot 10, and a plate-like protruding portion 12a protruding from the ring-like part 12b in the radial direction. In the present embodiment, the protruding direction of the protruding portion 12a is substantially parallel to the J5 axis, the plate thickness direction of the protruding portion 12a is substantially parallel to the J6 axis, and the operation unit body 31 of the operation unit 30 is attached to one of the surfaces of the protruding portion 12a in the plate thickness direction. The portion of the protruding portion 12a to which the operation unit body 31 is attached is made of iron, which is a ferromagnetic material.

In the robot operation apparatus of the present embodiment, the operation unit 30 is attached to the attachment member 12 such that the surface of the operation unit body 31 of the operation unit 30 on which the magnet 31b is provided contacts one of the surfaces of the protruding portion 12 in the plate thickness direction. Accordingly, the magnet 31b of the operation unit body 31 is attracted to the protruding portion 12a, and the Z axis of the operation unit 30 becomes substantially parallel to the J6 axis. Additionally, when the magnet 31b is attracted to the protruding portion 12a, the distance between the proximity sensor 31d and the protruding portion 12a is decreased, and the proximity sensor 31d detects that the surface of the operation unit body 31 on which the magnet 31b is provided has contacted the protruding portion 12a.

Figure 7:
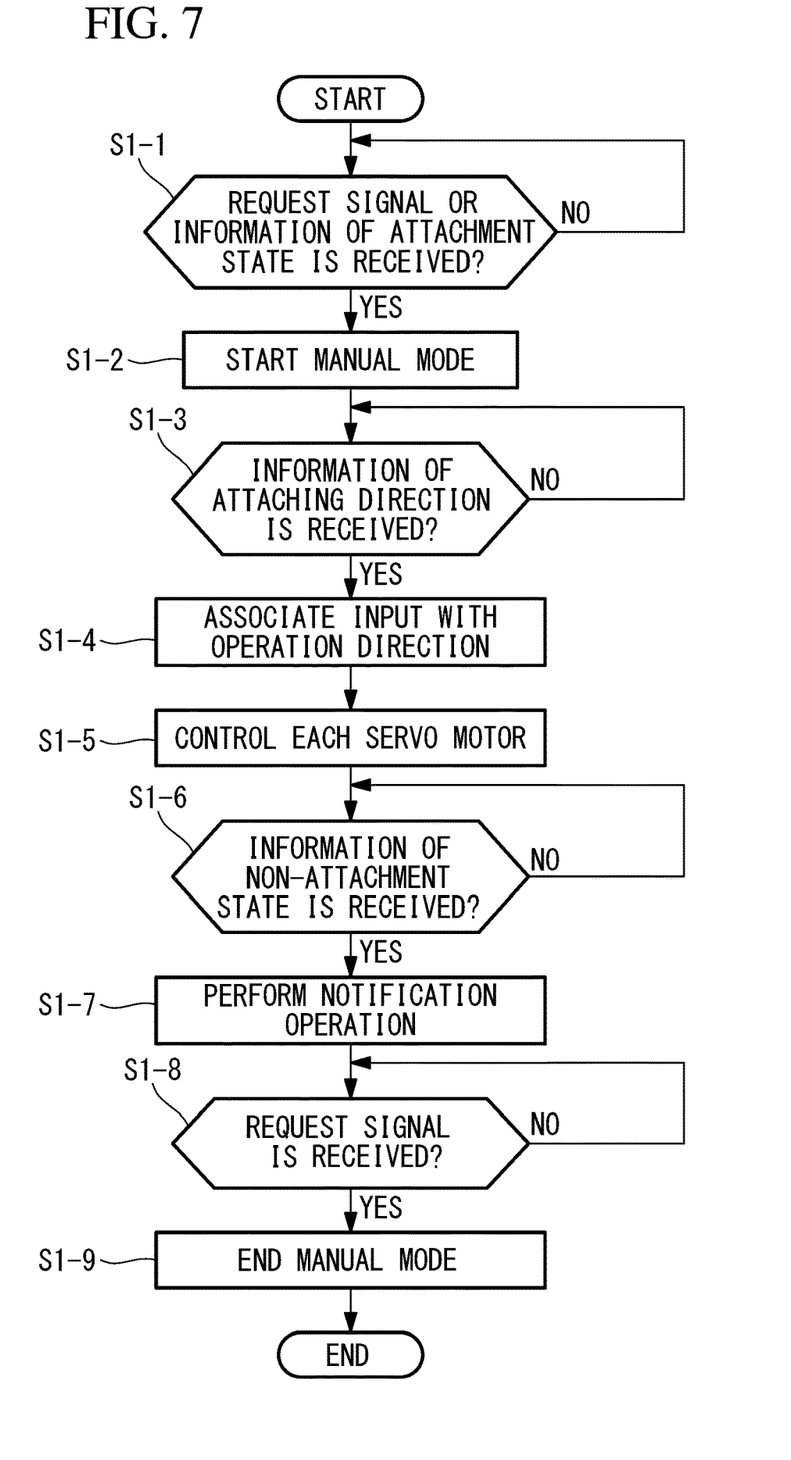
FIG. 7 is a flowchart showing an example of control of the control unit of the robot of the present embodiment.

Referring to the flowchart of FIG. 7, a description is given of the operation of the controller 41 at this moment based on the manual control program 43c.

First, when a request signal requesting the start of manual control is received from an input unit of the teach pendant 45, etc., or when the information indicating an attachment state where the proximity sensor 31d is close to the protruding portion 12a is received from the operation unit 30 (step S1-1), the manual mode is started that controls each of the servo controllers 44 based on the input to the operation unit 30 (S1-2).

Then, when the controller 41 receives the information of the attaching direction of the operation unit body 31 with respect to the protruding portion 12a of the attachment member 12 from the input unit of the teach pendant 45, etc. or the operation unit 30 (step S1-3), the controller 41 associates the input of the operation knob 32 of the operation unit 30 with the operation direction of the robot 10 (step S1-4).

In step S1-3, when the information indicating that the proximity sensor 31d is close to the protruding portion 12a is received from the operation unit 30, the controller 41 recognizes that the operation unit body 31 is attached in that direction. Additionally, in steps S1-3 and S1-4, whether the extending direction of the protruding portion 12a, i.e., the J5 axis direction matches the X axis direction or the Y axis direction of the operation unit body 31 is set to the controller 41 using detection results of the proximity sensors 31c and 31d or the information corresponding to the input from the input unit. In the present embodiment, the setting is performed such that the X axis direction of the operation unit body 31 matches the J5 axis.

Figure 8:
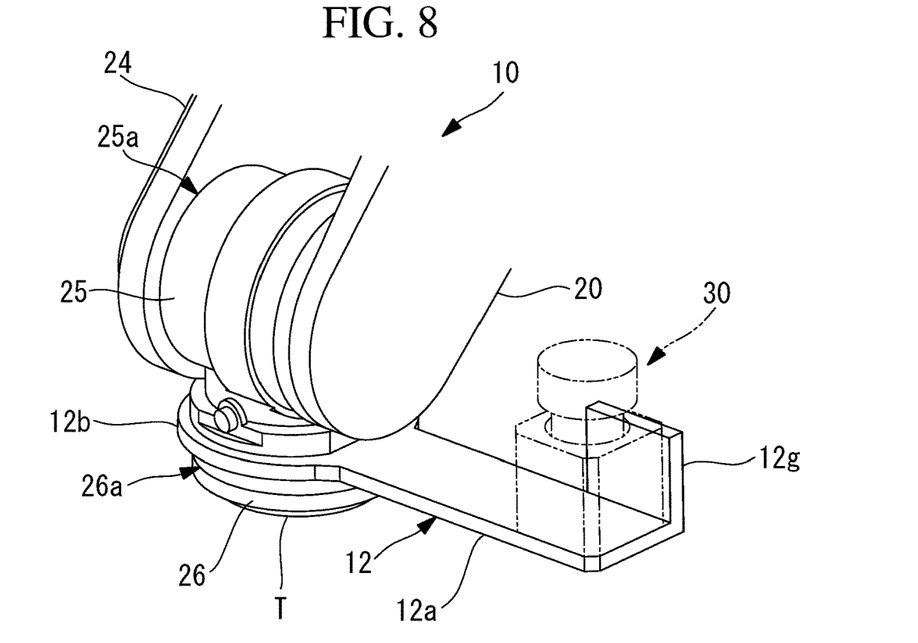
FIG. 8 is a perspective view showing an example of an attachment member fixed to the robot of the present embodiment.

For example, as shown in FIG. 8, when the magnet 31b on the surface in the Z axis direction and the magnet 31a on the surface in the Y axis direction of the operation unit body 31 are close to the protruding portion 12a and a extending portion 12g extending from the protruding portion 12a in the plate thickness direction, respectively, a proximity state is detected by the proximity sensor 31c and the proximity sensor 31d. Accordingly, the setting is performed such that the X axis direction of the operation unit body 31 matches the extending direction of the J5 axis.

Additionally, the setting is performed such that the Z axis direction of the operation unit body 31 matches the up-and-down direction of the robot 10, and the rotation around the Z axis of the operation knob 32 matches, for example, the rotation of the joint 26a, which is on the tip side of the arm member 25 to which the operation unit 30 is attached.

Figure 9:
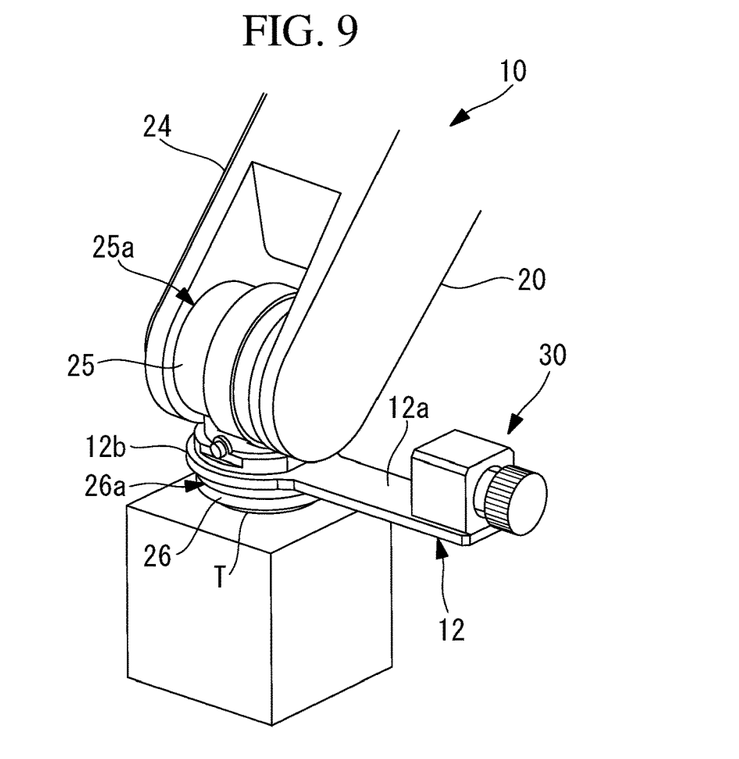
FIG. 9 is a perspective view showing a first modification of the attachment of the robot operation apparatus of the present embodiment to the robot.

On the other hand, as shown in FIG. 9, the operation unit 30 can also be attached to the protruding portion 12a such that the surface in the X axis direction and the surface in the Y axis direction of the operation unit body 31 are close to the protruding portion 12a and the extending portion 12g, respectively. In this case, based on the detection results of the proximity sensors 31c and 31d, the setting is performed such that the Z axis direction of the operation unit body 31 matches the extending direction of the J5 axis.

Additionally, the setting is performed such that the X axis direction of the operation unit body 31 matches the up-and-down direction of the robot 10, and the rotation around the Z axis of the operation knob 32 matches, for example, the rotation of the joint 25a closer to the base side of the arm member 25 to which the operation unit 30 is attached.

Then, the controller 41 sends a control signal to each of the servo controllers 44 in accordance with the signal transmitted from the signal generation unit 33 of the operation unit 30, thereby controlling the servo amplifier of each of the servo motors 11 of the robot 10 (step S1-5).

Then, when the controller 41 receives the information indicating a non-attachment state where the proximity sensors 31c and 31d are not close to the protruding portion 12a from the operation unit 30 (step S1-6), the controller 41 makes a notification section, such as the display 42 and a speaker, perform a predetermined notification operation (step S1-7). Then, upon reception of a request signal requesting the end of the manual control from the input unit of the teach pendant 45, etc. (step S1-8), the manual mode ends (step S1-9).

In this way, according to the present embodiment, the operation unit 30 is detachably attached to the attachment member 12 fixed to the arm member 25 of the robot 10 arranged closer to the base than the joint 26a closest to the tip among the plurality of joints 21a, 22a, 23a, 24a, 25a and 26a. Therefore, since the position and posture of the operation unit 30 are not changed by the movement of the joint 26a of the robot 10 closest to the tip, it is possible to reduce the change in the standing position and posture of the operator, and to reduce the circumstances where the operability is degraded by the posture of the robot operation apparatus.

Further, though the present embodiment has shown the case in which the operation unit 30 is detachably attached to the attachment member 12 fixed to the arm member 25, the operation unit 30 may be attached to the arm member 21, 22, 23, 24 or 25 of the robot 10 arranged closer to the base than the joint 26a closest to the tip, or may be attached to the attachment member fixed to the arm member 21, 22, 23 or 24. These cases also produce the same or a similar functions and effects as those in the above-mentioned case.

Additionally, in the present embodiment, the operation unit 30 is attached to the attachment member 12 fixed to the arm member 25 arranged between the joint 26a closest to the tip and the joint 25a arranged second closest to the tip. Therefore, the position and posture of the operation unit 30 are not changed by the movement of the joint 26a closest to the tip of the robot 10, and the movement of the operation unit 30 becomes similar to the movement of the tip of the robot 10. Therefore, it is possible to reduce the change in the standing position and posture of the operator while enabling an intuitive operation. The same or similar functions and effects are also produced when the operation unit 30 is directly attached to the arm member 25.

Further, in the present embodiment, the attachment member 12 includes the protruding portion 12a protruding from the peripheral surface of the arm member 25, and the magnets 31a and 31b provided in the operation unit 30 attracting the protruding portion 12a of the attachment member 12. Accordingly, the operation unit 30 is detachably attached to the attachment member 12.

With such a configuration, the operation unit 30 can be attached to the attachment member 12 fixed to the arm member 25 merely by making the magnets 31a and 31b provided in the operation unit 30 attracting to the protruding portion 12a of the attachment member 12. Additionally, the protruding portion 12a of the attachment member 12 is protruding from the peripheral surface of the arm member 25. Therefore, even when the operation unit 30 is attached to the attachment member 12 fixed to the arm member 25 between the joint 26a closest to the tip and the joint 25a arranged second closest to the tip, the distance between the tool T at the tip of the robot 10 or an article held by the tool T and the operator becomes long for the amount the protruding portion 12a protrudes from the peripheral surface of the arm member 25, which is advantageous for achieving the improvement of the operator's safety, the improvement of the objective operation of the robot 10 and its operability, etc.

Additionally, in the present embodiment, the operation unit 30 includes the proximity sensors 31c and 31d that detect the attachment state where the operation unit 30 is attached to the arm member 25 or the attachment member 12, and when the attachment state is not detected by the proximity sensors 31c and 31d, the notification section, such as the display 42 and the speaker, are controlled by the controller 41 of the control unit 40 to perform the predetermined notification operation. Therefore, the operator can positively recognize whether or not the operation unit 30 is properly attached, which is advantageous for safely operating the robot 10.

Further, the present embodiment includes the proximity sensors 31c and 31d that are provided in the attachment member 12 or the operation unit 30, and detect the attachment state where the operation unit 30 is attached to the attachment member 12, and the attaching direction to the attachment member 12 of the operation unit 30 in the attachment state, and includes the control unit 40 that controls the robot 10, and the control unit 40 is configured to associate the input to the operation unit 30 with the operation direction of the robot 10 in accordance with the information of the attaching direction detected by the proximity sensors 31c and 31d.

With such a configuration, the input direction to the operation unit 30 is automatically associated with the operation direction of the robot 10, and the operator can operate the robot 10 without caring about the attaching direction of the operation unit 30, and can also prevent the operation of the robot 10 in an unintended direction.

Note that, in step S1-7, the controller 41 made the notification apparatus, such as the display 42 and the speaker, perform the predetermined notification operation. Meanwhile, the notification section such as the speaker may be provided in the operation unit 30, and when the proximity sensors 31c and 31d shift from the proximity state to a non-proximity state, the notification section provided in the operation unit 30 may perform the predetermined notification operation.

Figure 10:
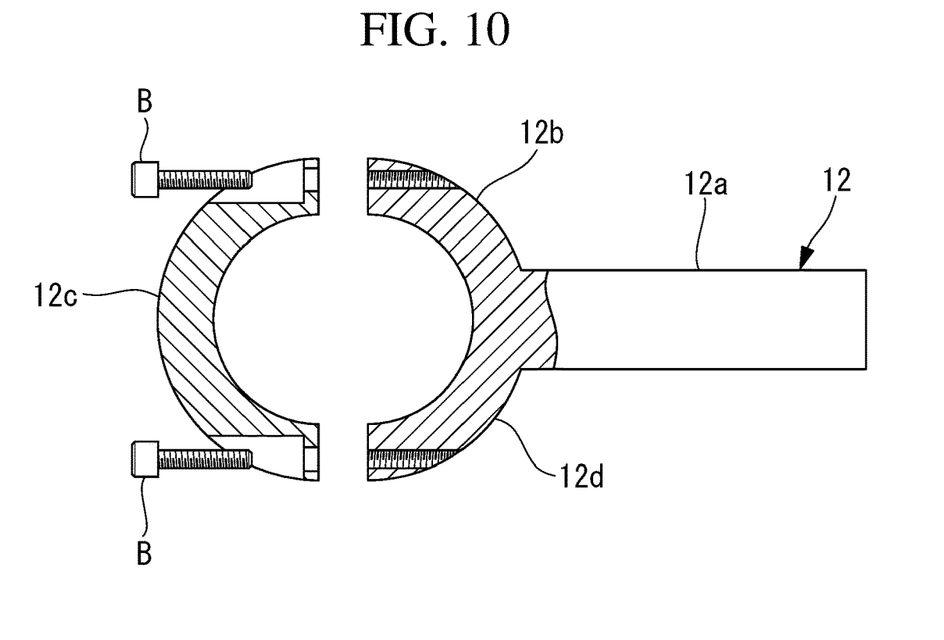
FIG. 10 is a top view showing an example of the attachment member of the present embodiment.

Further, as shown in FIG. 10, the ring-like part 12b of the attachment member 12 may be formed by a pair of half ring members 12c and 12d, and one of the half ring members, 12d may be integrally formed with the protruding portion 12a. In this case, the half ring members 12c and 12d are arranged so as to cling to the peripheral surface closer to the tip of the arm member 25, and the ends of the half ring member 12c are fastened to the ends of the half ring member 12d by bolts B.

Figure 11:
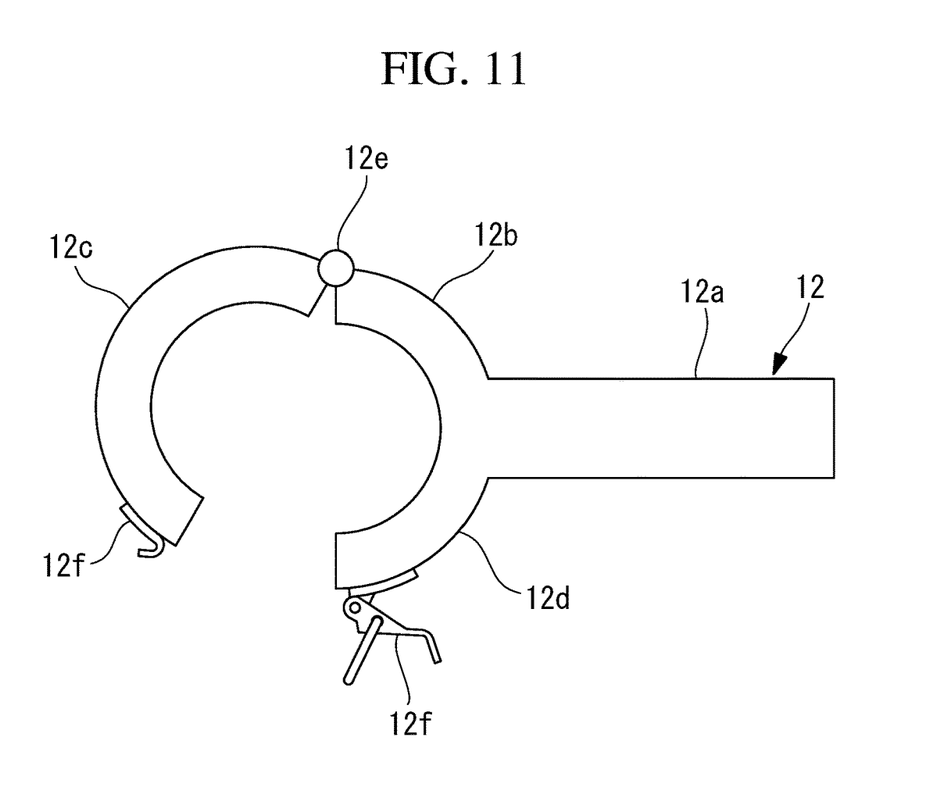
FIG. 11 is a top view showing another example of the attachment member of the present embodiment.

On the other hand, as shown in FIG. 11, one end of the half ring member 12c may be coupled to one end of the half ring member 12d by a hinge 12e, and the other end of the half ring member 12c may be fastened to the other end of the half ring member 12d by a snap lock 12f. In this case, the attachment member 12 can be attached to and detached from the peripheral surface of the arm member 25 in a short time.

Figure 12:
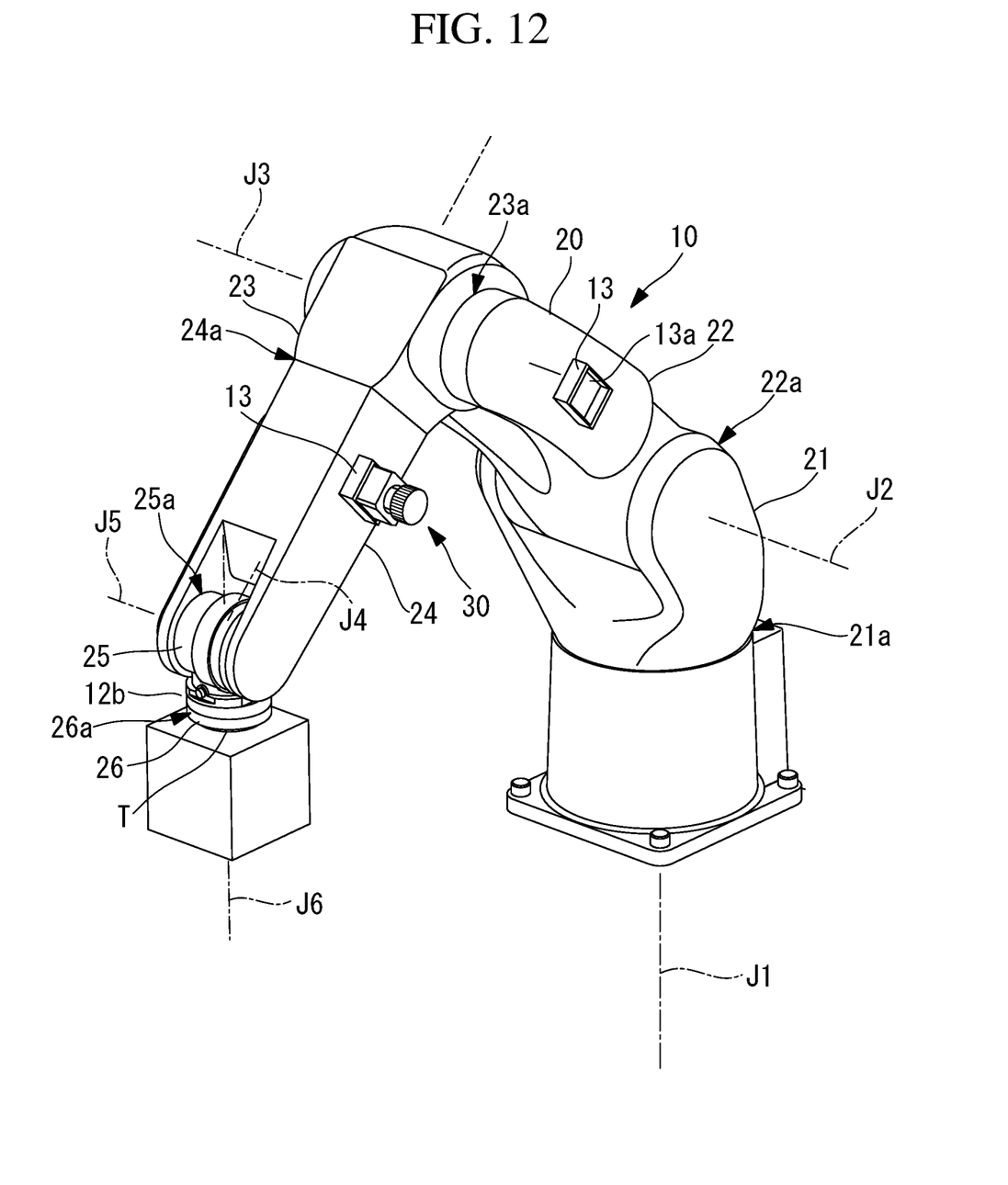
FIG. 12 is a perspective view showing a second modification of the attachment of the robot operation apparatus of the present embodiment to the robot.
Figure 13:
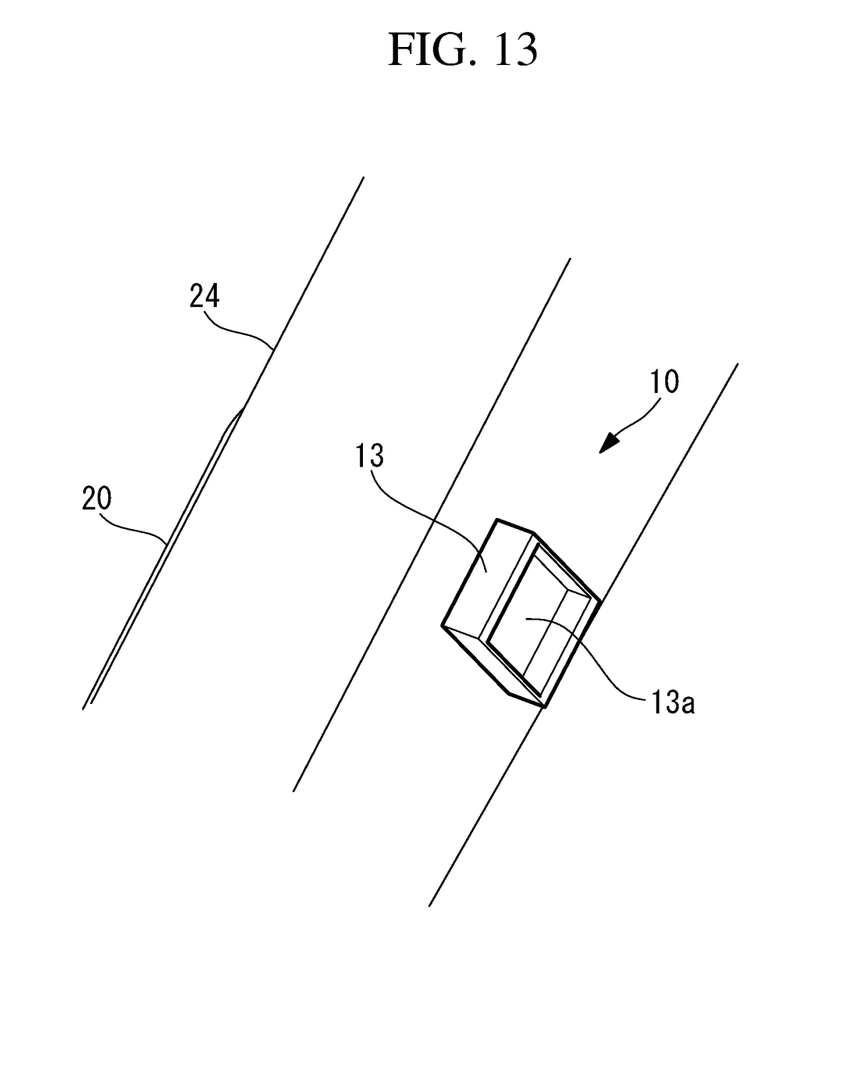
FIG. 13 is a perspective view of the attachment member shown in FIG. 12.

FIG. 12 shows the case where the operation unit 30 is attached to the arm member 24. In this case, an attachment member 13 is fixed to the arm member 24, and the operation unit 30 is attached to the attachment member 13. As shown in FIG. 13, a recessed portion 13a is formed in the attachment member 13, and the surface of the operation unit body 31 facing the Z axis direction contacts the bottom of the recessed portion 13a. Additionally, the recessed portion 13a has a slightly larger shape than the operation unit body 31, and is formed such that the operation unit 30 is attached to the recessed portion 13a in the posture in which the X axis of the operation unit body 31 becomes parallel to a longitudinal axis line of the arm member 24, and the Z axis of the operation unit body 31 becomes parallel to the J5 axis, for example.

That is, the attachment member 13 that is fixed to the arm member 24 and to which the operation unit 30 is attached is configured such that the operation unit 30 is attached to the arm member 24 in a predetermined attachment posture. Accordingly, the posture of the operation unit 30 inevitably takes the predetermined attachment posture with respect to the arm member 24. Therefore, it is easy to recognize the relationship between the operation direction of the operation unit 30 and the operation of the robot 10, and an intuitive operation is also enabled, which is advantageous for improving the operability.

Figure 14:
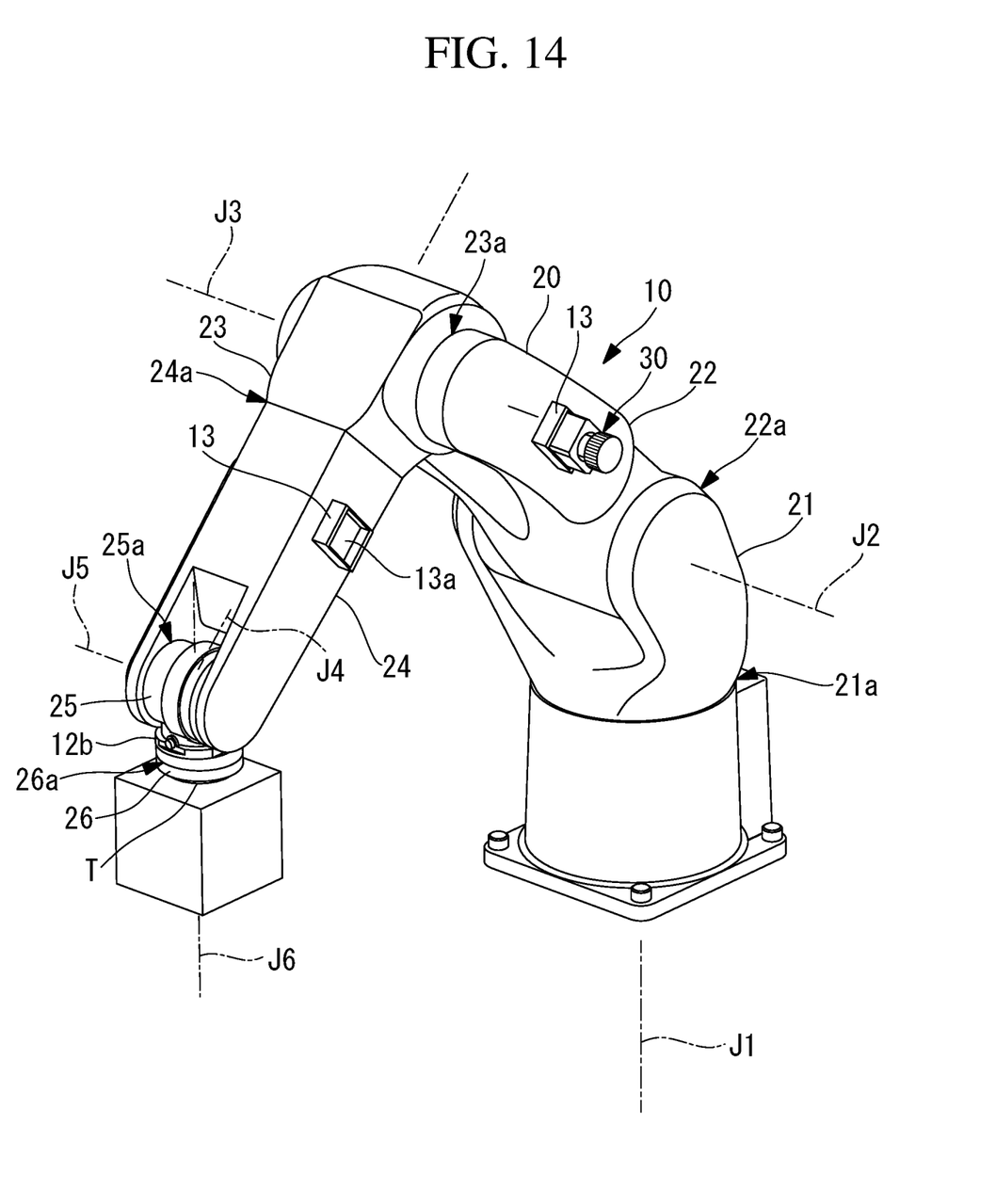
FIG. 14 is a perspective view showing a third modification of the attachment of the robot operation apparatus of the present embodiment to the robot.

As shown in FIG. 14, also in the case where the operation unit 30 is attached to the arm member 22, as in the case where the operation unit 30 is attached to the arm member 24, the attachment member 13 can be configured such that the operation unit 30 is attached to the arm member 22 in a predetermined attachment posture.

Additionally, in the present embodiment, based on the manual control program 43c, it is possible for the controller 41 to move only the joint 21a, 22a, 23a, 24a or 25a closer to the base than the arm member 25 to which the operation unit 30 is attached, based on the signal from the operation unit 30, and not to move the joint 26a closer to the tip than the arm member 25, or to make the joint 26a take a predetermined posture.

Also in the cases of the modifications shown in FIG. 12 and FIG. 14, it is possible for the controller 41 to move only the joint closer to the base than the arm members 22 and 24 to which the operation unit 30 is attached, based on the signal from the operation unit 30, and not to move the joint closer to the tip than the arm members 22 and 24, or to make the joint closer to the tip than the arm members 22 and 24 take a predetermined posture.

With such a configuration, the operator will move the side closer to the base than the arm members 22 and 24 to which the operation unit 30 is attached. Such an operation is used when moving the entire arm part 20 of the robot 10 to a target direction or position, etc. Since the operator will operate the operation unit 30 while assuming the movement of the side closer to the base than the arm members 22 and 24 to which the operation unit 30 is attached, compared with the case where all the joints 21a, 22a, 23a, 24a, 25a and 26a of the robot 10 move, the operation of the robot 10 becomes easy.

Additionally, for example, in the modifications of FIG. 12 and FIG. 14, a sensor may be provided that detects that the operation unit 30 is installed in the attachment member 13, the arm member to which the operation unit 30 is attached may be detected in accordance with the detection result of the sensor, and the controller 41 may be configured to move only the joint closer to the base than the arm member to which the operation unit 30 is attached, based on the signal from the operation unit 30.

The present embodiment can be used in the case where an industrial robot arranged in a safety fence, etc. is manually operated, the case where a collaborative robot having a common work area with a human being is manually operated, and the case where other robots are manually operated. Additionally, the present embodiment is applicable not only to the 6-axis robot 10, but also to a robot having 7 or more axes or a robot having 5 or less axes.

Additionally, in the case of the collaborative robot, since it is necessary to operate each joint of the collaborative robot on a teach pendant while pushing an enable switch (deadman switch) which is usually on a handheld portion of the teach pendant of the collaborative robot using, for example, a left hand, the usability is bad. Further, when operating the teach pendant while closely watching the operation of the tip side of the collaborative robot, it is necessary to carry the teach pendant by at least one of the hands. Meanwhile, when the present invention is applied, the operation of the robot using the operation unit 30 can be performed even with a single hand.

Additionally, since the collaborative robot is provided with a safety stop function for stoppage when a load equal to or more than a predetermined magnitude is applied, it is possible to safely perform the operation of the robot using the operation unit 30 without carrying the teach pendant.

Further, the operation of the robot using the teach pendant is not generally easy. However, in the present embodiment, the operation of the robot can be sensuously performed by using the operation unit 30. Thus, the present embodiment is also suitable for a person who is unfamiliar to the operation of the robot.

From the above-described embodiments, the following aspects of the present disclosure are derived.

A robot operation apparatus according to one aspect of the present disclosure is a robot operation apparatus for operating a robot having a plurality of joints, the robot operation apparatus including: an operation unit that transmits a signal corresponding to an operation by an operator to a control unit of the robot, wherein the operation unit is configured to be detachably attached to an arm member of the robot arranged closer to a base than a joint closest to a tip among the plurality of joints, or detachably attached to an attachment member fixed to the arm member.

In the aforementioned aspect, the operation unit is detachably attached to the arm member of the robot arranged closer to the base than the joint closest to the tip among the plurality of joints, or detachably attached to the attachment member fixed to the arm member, and the position and posture of the operation unit are not changed by the movement of the joint closest to the tip of the robot. Therefore, it is possible to reduce the change in the standing position and posture of the operator.

In the aforementioned aspect, preferably, the operation unit is configured to be detachably attached to the arm member by a magnet.

With such a configuration, there is no need to prepare a dedicated member for attaching the operation unit to the arm member, which is advantageous for improving the degree of freedom of a place to which the operation unit is attached.

In the aforementioned aspect, preferably, the attachment member that is fixed to the arm member and to which the operation unit is attached is configured such that the operation unit is attached to the arm member in predetermined attachment posture.

With such a configuration, the posture of the operation unit inevitably takes the predetermined attachment posture with respect to the arm member. For example, when the longitudinal direction of the arm member matches the X axis direction of the operation unit, and the orthogonal direction of the longitudinal direction always matches the Y axis direction of the operation unit, it is easy to recognize the relationship between the operation direction of the operation unit and the operation of the robot, and an intuitive operation is also enabled, which is advantageous for improving the operability.

In the aforementioned aspect, preferably, the arm member is arranged between the joint closest to the tip and the joint arranged second closest to the tip.

With such a configuration, the position and posture of the operation unit are not changed by the movement of the joint closest to the tip of the robot, and the movement of the operation unit becomes similar to the movement of the tip of the robot. Therefore, it is possible to reduce the change in the standing position and posture of the operator while enabling an intuitive operation.

In the aforementioned aspect, preferably, the attachment member includes a protruding portion protruding from a peripheral surface of the arm member, and the operation unit is configured to be detachably attached to the attachment member by a magnet provided in the operation unit, the magnet attracts the protruding portion of the attachment member.

With such a configuration, the operation unit can be attached to the attachment member fixed to the arm member merely by making the magnet provided in the operation unit attracted to the protruding portion of the attachment member. Additionally, the protruding portion of the attachment member is protruding from the peripheral surface of the arm member. Therefore, even when the operation unit is attached to the attachment member fixed to the arm member between the joint closest to the tip and the joint arranged second closest to the tip, for example, the distance between the tool at the tip of the robot or the article held by the tool and the operator becomes long for the amount the protruding portion protrudes from the peripheral surface of the arm member, which is advantageous for achieving the improvement of the operator's safety, the improvement of the objective operation of the robot and its operability, etc.

In the aforementioned aspect, preferably, an attachment state detection sensor provided in the operation unit, and detecting an attachment state of the operation unit being attached to the arm member or the attachment member, and a notification section which performs a predetermined notification operation when the attachment state is not detected by the attachment state detection sensor are provided.

With such a configuration, the operator can positively recognize whether or not the operation unit is properly attached, which is advantageous for safely operating the robot.

In the aforementioned aspect, preferably, an attachment state detection sensor provided in the attachment member or the operation unit, for detecting an attachment state where the operation unit is attached to the attachment member, and an attaching direction of the operation unit relative to the attachment member in the attachment state, and the control unit controlling the robot are provided, wherein the control unit is configured to associate an input to the operation unit with an operation direction of the robot in accordance with information of the attaching direction detected by the attachment state detection sensor.

For example, when the operation unit is attached to the attachment member such that the X axis direction and the Y axis direction of the operation unit match the Y axis direction and the X axis direction of the robot, respectively, the control unit associates an input to the operation unit with the operation direction of the robot such that an input to the X axis direction of the operation unit corresponds to an input to the X axis direction of the robot, and an input to the Y axis direction of the operation unit corresponds to an input to the Y axis direction of the robot. In this manner, with a configuration in which the input direction to the operation unit is automatically associated with the operation direction of the robot, the operator can operate the robot without caring about the attaching direction of the operation unit, and can also prevent the operation of the robot in an unintended direction.

According to aforementioned aspects, it is possible to improve the work efficiency by reducing the change in the standing position and posture of the operator.

REFERENCE SIGNS LIST 10 robot
11 servo motor
12 attachment member
12a protruding portion
12g extending portion
13 attachment member
13a recessed portion
20 arm part
21-26 arm members
21a-26a joints
30 operation unit
31 operation unit body
31a, 31b magnets 31c, 31d proximity sensors (attachment state detection sensors)
32 operation knob
33 signal generation unit
TM motor

The invention claimed is:

1. A robot operation apparatus for operating a robot having a plurality of joints, the robot operation apparatus comprising:
   an operation unit that transmits a signal corresponding to an operation by an operator to a control unit of the robot,
   wherein the operation unit includes an operation unit body, and an operation knob attached to the operation unit body, the operation knob is rotatable around a predetermined rotation axis and operable in an X axis direction and a Y axis direction orthogonal to the predetermined rotation axis,
   the operation unit is configured to be detachably attached to an attachment member fixed to an arm member of the robot arranged between a joint closest to a tip among the plurality of joints and a second joint from the tip,
   a wrist flange member that is arranged closer to the tip than the joint closest to the tip of the robot is a member to which a tool is attached,
   the attachment member has a part fixed to the arm member, and a plate-like protruding portion protruding from the part and protruding along a rotation axis of the second joint, and
   the protruding portion of the attachment member is configured to contact two or more outer surfaces of the operation unit body of the operation unit, and by contacting the two or more outer surfaces of the operation unit body, the operation unit is configured to be attached to the arm member so that the predetermined rotation axis is substantially parallel to a rotation axis of the joint closest to the tip.

2. The robot operation apparatus according to claim 1, wherein the operation unit is configured to be detachably attached to the arm member by a magnet.

3. The robot operation apparatus according to claim 1, wherein the arm member is arranged between the joint closest to the tip and the joint arranged second closest to the tip.

4. The robot operation apparatus according to claim 1, wherein
   the operation unit is configured to be detachably attached to the attachment member by a magnet provided in the operation unit, the magnet attracts the protruding portion of the attachment member.

5. The robot operation apparatus according to claim 1, further comprising:
   an attachment state detection sensor provided in the attachment member or the operation unit, for detecting an attachment state where the operation unit is attached to the attachment member, and an attaching direction of the operation unit relative to the attachment member in the attachment state; and
   the control unit controlling the robot,
   wherein the control unit is configured to associate an input to the operation unit with an operation direction of the robot in accordance with information of the attaching direction detected by the attachment state detection sensor.

* * * * *